(12) United States Patent
Franchetta

(10) Patent No.: US 7,191,721 B2
(45) Date of Patent: Mar. 20, 2007

(54) INNOVATIVE HULL-LESS NAVAL VESSEL

(76) Inventor: Mario Franchetta, Viale Delle Mimose 14, Napoli (IT) I-80128

( * ) Notice: Subject to any disclaimer, the term of this patent is extended or adjusted under 35 U.S.C. 154(b) by 0 days.

(21) Appl. No.: 11/098,407

(22) Filed: Apr. 5, 2005

(65) Prior Publication Data

US 2006/0086298 A1 Apr. 27, 2006

(30) Foreign Application Priority Data

Oct. 7, 2004 (IT) .......................... RM2004A0482

(51) Int. Cl.
*B63B 43/10* (2006.01)
(52) U.S. Cl. ..................... 114/67 R; 440/100
(58) Field of Classification Search ............... 440/100, 440/98, 90, 37; 114/67 R, 67 A, 346, 274
See application file for complete search history.

(56) References Cited

U.S. PATENT DOCUMENTS

| | | | | |
|---|---|---|---|---|
| 1,258,428 A | * | 3/1918 | Marling | .................... 114/67 R |
| 1,380,296 A | * | 5/1921 | Hill | ............................ 114/163 |
| 1,853,125 A | * | 4/1932 | Hitt | ............................ 114/272 |
| 4,712,630 A | * | 12/1987 | Blum | ......................... 180/117 |
| 5,385,498 A | * | 1/1995 | Parvardeh | ................... 441/129 |
| 5,562,061 A | * | 10/1996 | Crocker | ....................... 114/43 |
| 5,807,149 A | * | 9/1998 | Kaye | ........................... 440/37 |
| 5,829,376 A | * | 11/1998 | Kostanski | .................. 114/61.1 |
| 2002/0098751 A1 | * | 7/2002 | Kireev | ........................ 440/90 |

* cited by examiner

*Primary Examiner*—Stephen Avila
(74) *Attorney, Agent, or Firm*—Young & Thompson

(57) ABSTRACT

A hull-less naval vessel includes a platform completely raised from the liquid medium by of rotating floating elements fixed beneath the platform by of ball bearings. Through the lifting effect of the floating elements, the vessel will glide on the liquid surface without ploughing it; forward movement will take place almost completely in the air, thus achieving a considerable energy savings.

27 Claims, 5 Drawing Sheets

INNOVATIVE HULL-LESS NAVAL VESSEL

BACKGROUND OF THE INVENTION

The present invention refers to an innovative hull-less naval vessel and more particularly to a floating support structure for a vessel.

As it is known, from a constructional point of view the main element of a naval vessel is the hull, which fulfils various functions. First of all, it is a structural element of the vessel and moreover it ensures the floating by providing the necessary buoyancy, it allows the travel in the liquid medium through a suitable hydrodynamic shape and it provides a support structure on which cabins, garages for motor vehicles, holds for goods, etc. are realised.

Over time the hull has continually been improved in its structure and in its hydrodynamic qualities with the objective of obtaining an ever-higher navigational speed with the least possible expenditure of propulsive energy.

These improvements have a limit, however, imposed by the physical characteristics of the liquid medium, which resists the movement with its density and viscosity, which are much greater than those of air.

The starting point for the construction of an innovative naval vessel that allows a real and significant energy saving was to criticise and thus to overcome the concept of hull.

During the movement a hull is called upon to move a volume of liquid proportional to the size of its submerged part. Furthermore, there will also be a resistance due to the friction with the liquid, the generation of a train of waves due to the movement of the hull and the generation of eddies due to the rotation of the propellers. All these factors contribute to increase the overall resistance to the forward movement of the hull through the water.

Thus, it is noted that the energy expenditure to increase the speed rapidly becomes very great as the speed increases.

In order to increase the speed, to save energy and to overcome the limits imposed by the liquid medium, designers tend to raise the vessel structure from the water as much as possible so that the movement takes place mainly and as far as possible in the air.

Hydrofoils, hovercrafts and gliding hull boats have thus been developed, based on the common principle of making the hull emerge from the water as much as possible when a certain speed is exceeded. However, to obtain this result it is necessary to use very powerful engines with a high-energy expenditure. As a result, said principle cannot normally be applied to large vessel such as the large commercial boats, remaining confined to the fast transport of passengers on limited distances. Moreover, vessels realised according to this principle (gliding hull) generally find themselves in difficulty if the sea is rough.

SUMMARY OF THE INVENTION

The object of the present invention is therefore to solve the above problems by providing a novel floating support structure.

A structure according to the present invention brings numerous advantages with respect to the classical method of naval construction.

First of all, such a structure eliminates almost totally all the frictions and the wastes of energy which typically occur during movement of a vessel of the prior art in a liquid medium (creation of a boundary layer, turbulence and production of a wake and of wave trains, displacing of masses of water for the hull forward movement, etc.)

This involves the possibility of obtaining a very high efficiency, as it is possible to reach high speeds without the need for propulsion thrusts that are oversized with respect to the tonnage of the vessel.

Two further important advantages of the structure proposed with the present invention are the economy and the modularity of construction.

In fact, by using the present invention the construction of a vessel can be separated into distinct stages very advantageously with respect to the traditional construction methods. The floating support structure and the body of the vessel (cabins, goods spaces, etc.) can follow completely independent construction courses and can be assembled only once construction is completed, thus obviously making all the shipyard operations much simpler and allowing both cost-related and technical-functional aspects to be optimised.

Moreover, from a constructional point of view, the support structure, made by means of simple trusses and provided with floats to obtain the necessary buoyancy, proves to be of particularly simple construction if compared with a conventional hull.

A further advantage is given by the fact that each of the floating elements constitutes a different watertight compartment and thus, given their number, the vessel is substantially unsinkable, to the benefit of the safety, even with a rough sea.

BRIEF DESCRIPTION OF THE DRAWINGS

Further advantages, like the characteristics and the mode of use of the present invention, will be made clear by the following detailed description of preferred embodiments thereof, presented by way of non-limiting examples, with reference to the appended drawings, in which.

DESCRIPTION OF THE PREFERRED EMBODIMENTS

Figure 1:
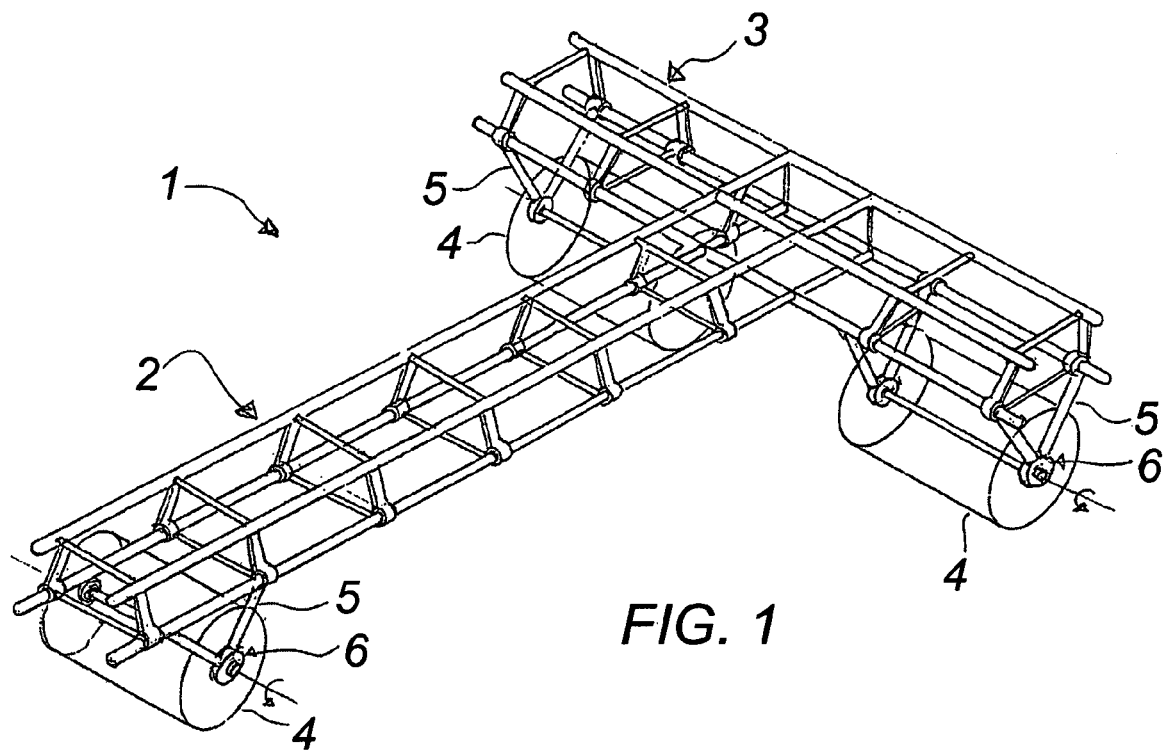
FIG. 1 is a perspective view of a support structure according to the present invention.
Figure 2:
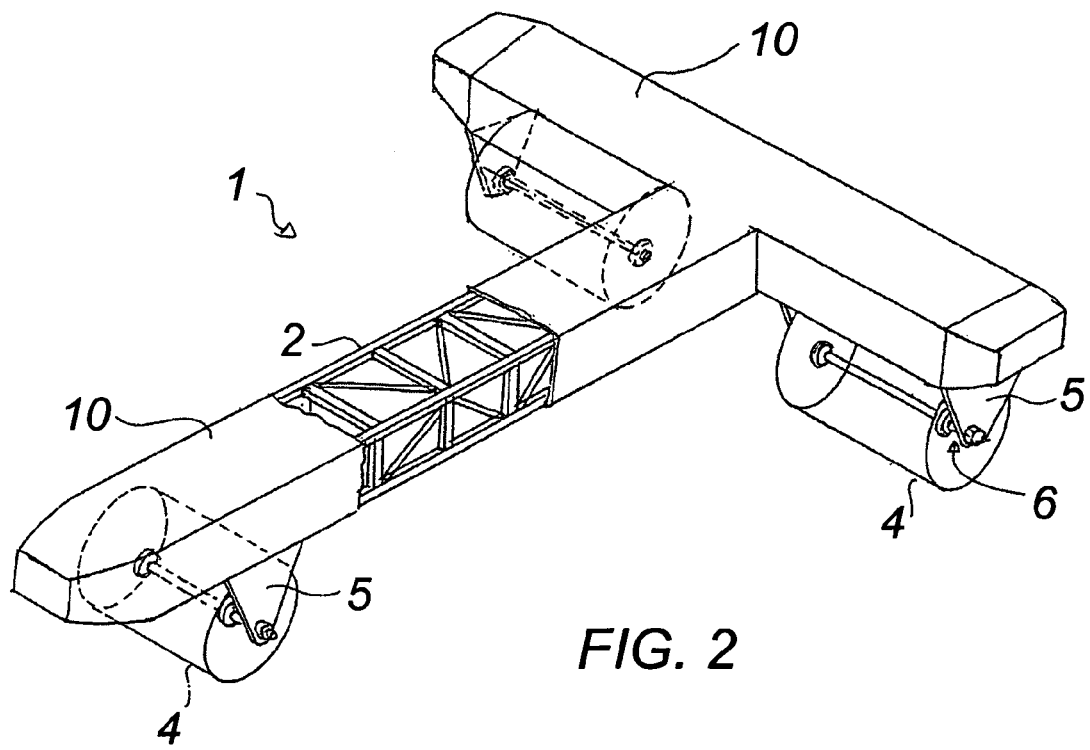
FIG. 2 is a perspective view of the support structure of FIG. 1 with a protective covering.

With reference first of all to FIGS. 1 and 2, a floating support structure 1 able to support a vessel body in the water, as will be explained in detail, will be described hereunder.

The structure 1 comprises a first longitudinal beam element 2 disposed according to the length of what will then be the vessel and which extends from the bow to the stern of said vessel.

A second beam element 3 is transversally connected to the first beam element 2. The two elements 2 and 3 together form a T-shaped structure in which the longitudinal element 2 advantageously has a length greater than that of the transverse element 3.

In fact, a T-shaped structure having a greater dimension in the direction of movement is considered the most suitable one to create a sea-going vessel that has to overcome waves.

In fact, a sufficiently long longitudinal element (with respect to the dimensions of the vessel) allows the groundswell to be overcome easily and safely, whilst a transverse element aft ensures greater lateral stability, minimising rolling.

Of course, the structure may also be differently shaped, for example H-shaped or delta-shaped, while still maintaining the length/width proportions indicated.

The beam elements are preferably made by means of mechanical coupling of lattice elements, so as to form a lattice structure, preferably made of metal or of plastic materials.

The structure further comprises a multiplicity of float elements 4 connected to the structure by means of respective supports 5.

In particular the float elements 4 have an axially symmetrical shape, with an axis of rotation.

These floats 4 further comprise means for rotatable connection to the structure, for example a shaft, able to allow rotation of said float around its own axis.

The floats, made of plastic or of metal or with a pneumatic structure, are preferably produced with a cylindrical or toroidal shape and are mounted rotatably on supports 6, by means of rolling devices with a low coefficient of friction, as for example ball bearings. In this manner the floats 4 can turn freely around their axis disposed transversally with respect to said first beam element (whose direction coincides with the direction of navigation).

The function of the float elements 4 is that of keeping the entire support structure (and the vessel body supported thereby) completely raised from the liquid medium.

Moreover, the rotating float elements 4 during navigation perform functions equivalent to those of a wheel for a land vehicle.

The number of float elements 4 and their arrangement to support the structure 1 will naturally be determined on the basis of the specific requirements of the case, of the tonnage of the vessel that is to be constructed, etc., with the object of making the vessel practically unsinkable to the benefit of the safety even with a rough sea and of raising the vessel from the water as much as possible during navigation.

The support structure 1 can advantageously be covered with a protective covering 10.

Figure 3:
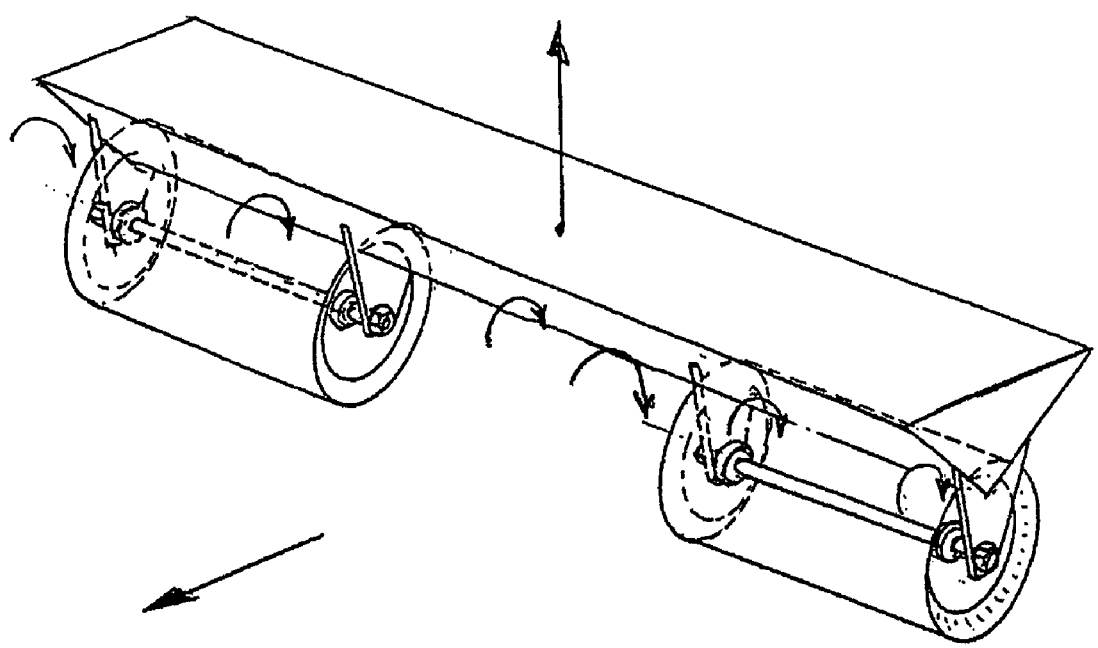
FIG. 3 is a perspective view of a particular embodiment of one of the beam elements of a support structure according to the present invention.

With reference to FIG. 3, a preferred embodiment of the invention will now be described, wherein the transverse beam element 3, normally disposed aft, is completely covered with the covering or made in the form of a box-type structure and its section is substantially triangular in shape with the tip facing towards the water.

In this manner, the transverse stern element 3 has the front surface inclined in the direction of movement so as to push downward the flows of air and of water which strike it as it moves. In this manner the lift effect (which increases as the speed increases) is increased, helping to lift the vessel.

Figure 4:
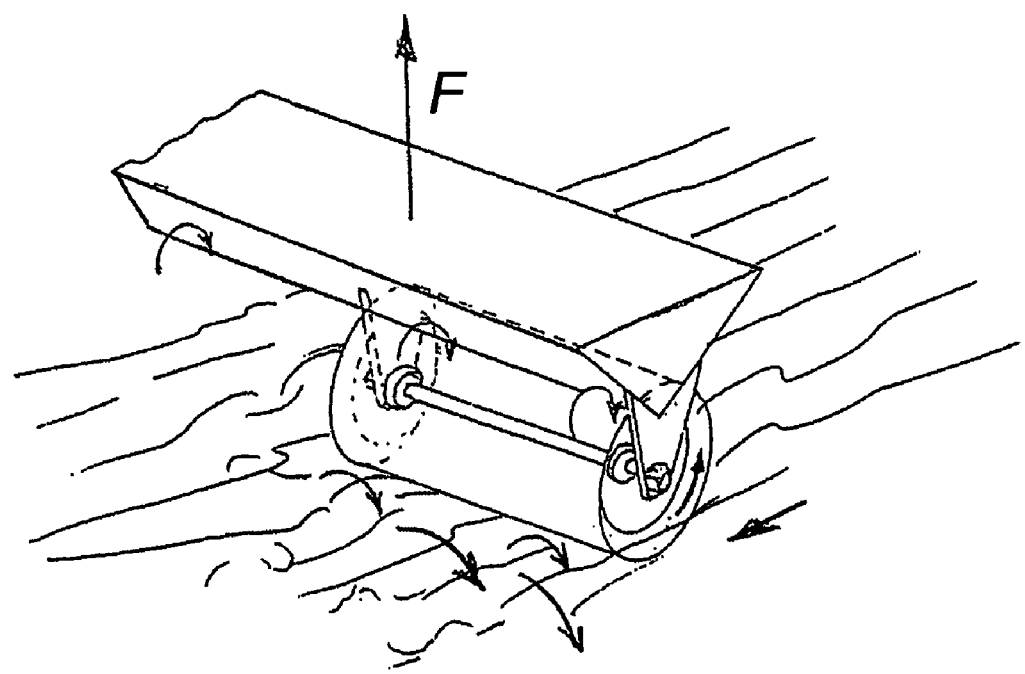
FIG. 4 illustrates an operational aspect of a structure according to the present invention.
Figure 5A:
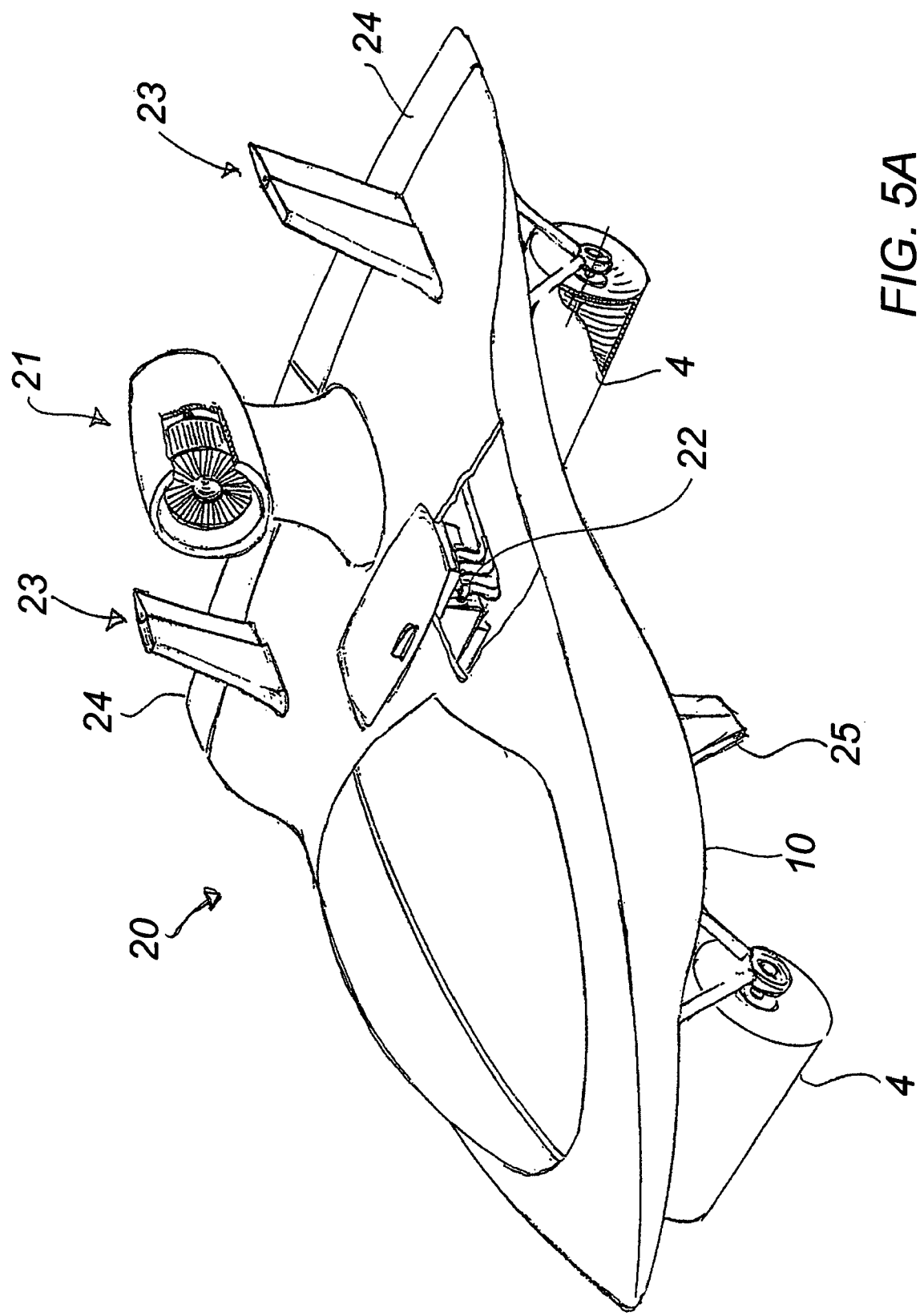
FIGS. 5A and 5B are perspective views of a vessel according to the present invention.
Figure 5B:
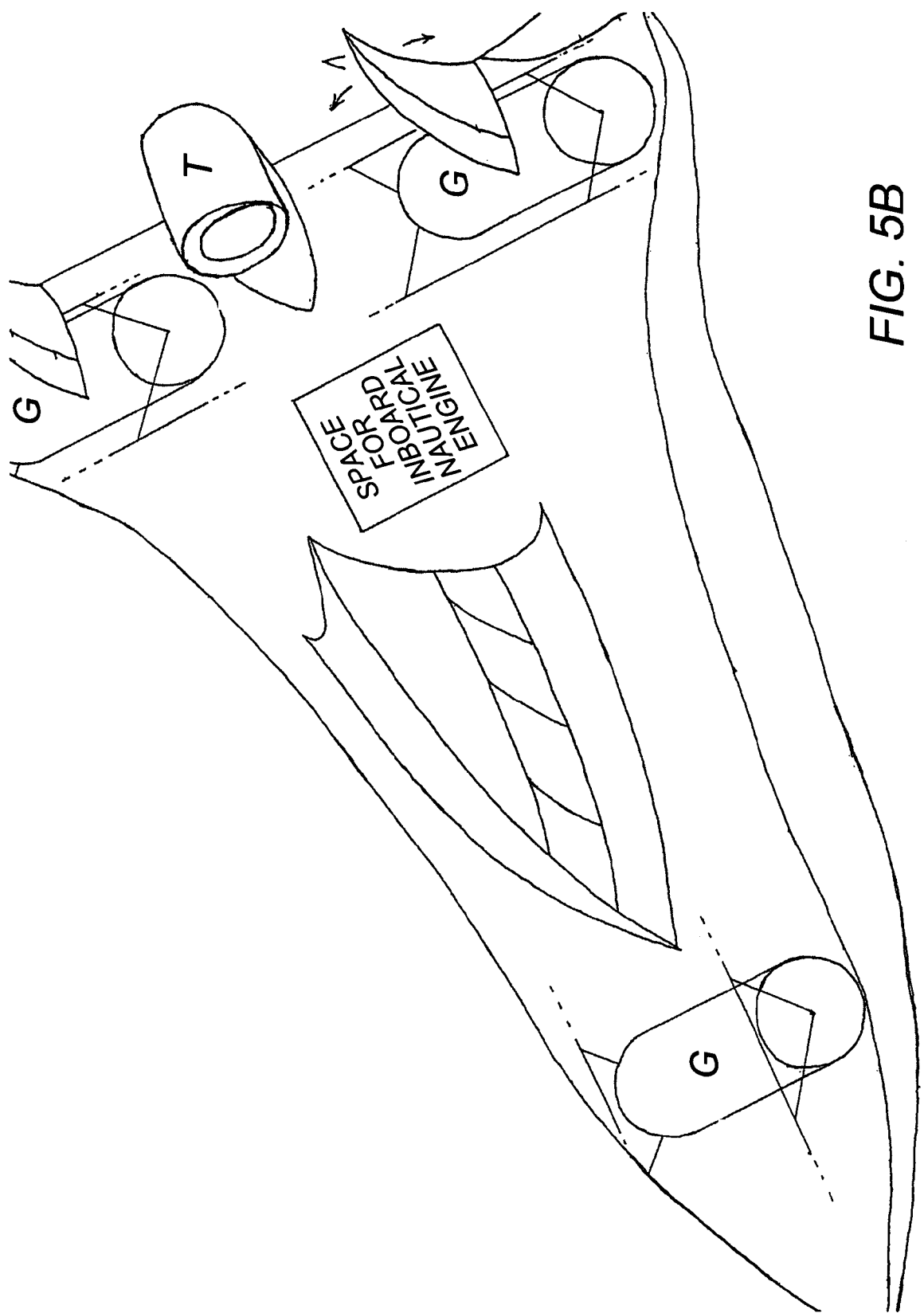
Figure 6:
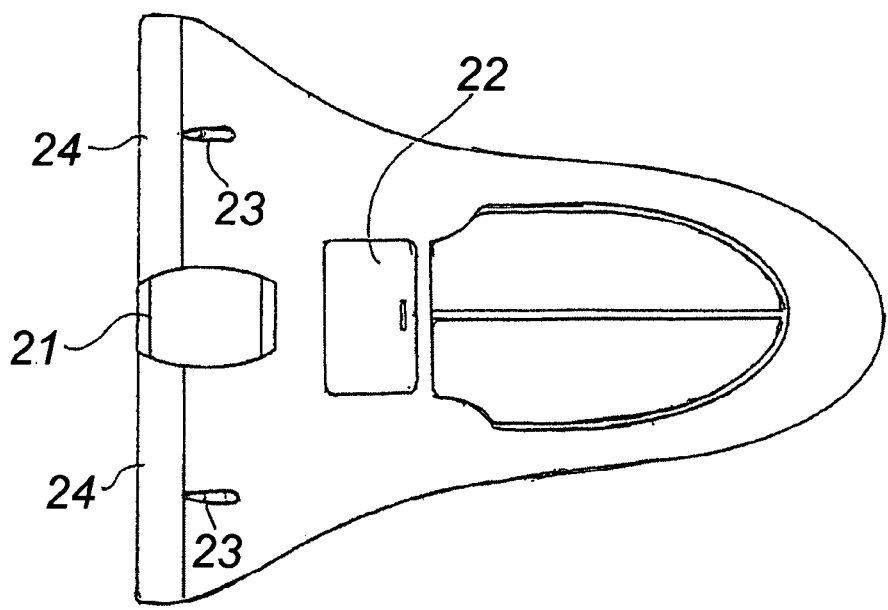
FIGS. 6 and 7 are two plan views, respectively a top and a bottom plan view, of the vessel of FIG. 5A.
Figure 7:
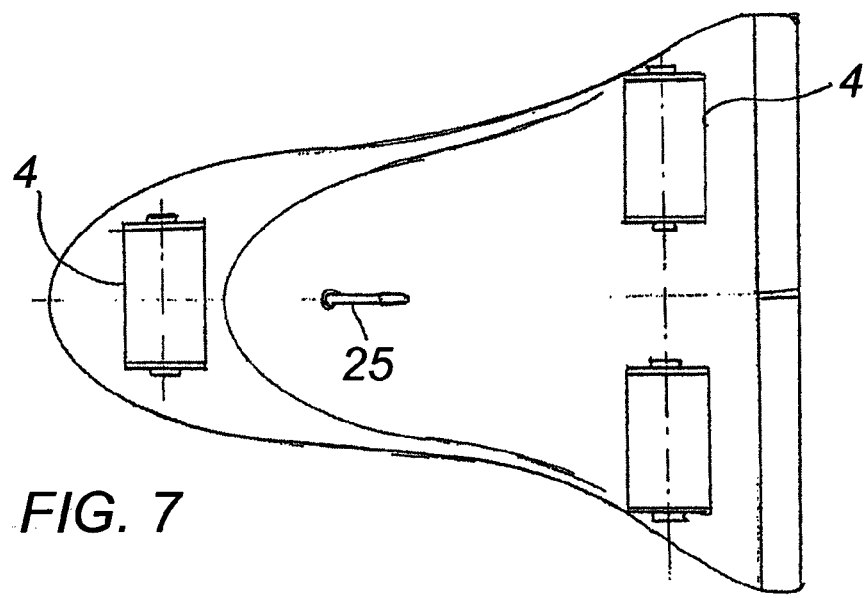
Figure 8:
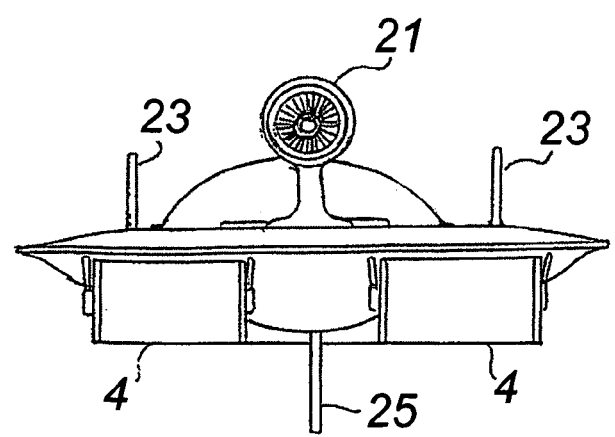
FIG. 8 is a rear view of the vessel of FIG. 5A.

With reference to FIG. 4, a further advantageous aspect of operation of the present invention is illustrated.

In particular, as the vessel moves forward, the main friction present will be the rolling friction located in the ball bearings with which the floats are fixed to the structure, whilst the movement of liquid will be very small with respect to that caused by a displacement or by a gliding hull. During movement the submerged part of each float tends to push the mass of water in front of it downwards. This generates a reaction force F that pushes upwards the float and thus the entire structure to which it is connected. A significant lift effect is thus generated at the interface between the cylindrical floats and the liquid medium. In short, a lift effect is produced and exploited in an innovative manner.

The float elements can easily mass-produced, all of equal size and using inexpensive, strong materials, such as sheet steel, reinforced plastic or even as a pneumatic structure. The simple cylindrical shape with an axis of rotation makes them very inexpensive with the possibility of mass-production in large numbers.

One or more of said float elements 4 is advantageously mounted on the respective supports by means of a corresponding suspension device, for example spring and hydraulic or pneumatic shock absorber systems. The impact with the waves can thus be softened, making movement of the vessel more comfortable.

Moreover, one or more of said float elements may advantageously have protruding flaps made on its surface and arranged so as to facilitate the rolling in the liquid medium.

The structure according to the present invention allows a particularly high efficiency to be achieved. In fact, whilst in the usual gliding hulls the lift effect is obtained by the sliding of the liquid along the suitably inclined surface of the hull (and thus with the inevitable generation of friction and of considerable turbulence and with dissipation of energy), in the proposed vessel the sliding is almost absent thanks to the rotation of the float surfaces which are in contact with the liquid. As the speed increases there will be a corresponding increase in the lift effect and thus a state in which the vessel merely skims the surface of the water. Consequently, the movement takes place almost completely in the air with an enormous energy saving, a great increase in speed and a very low generation of a wake in the liquid medium. Moreover, the friction will be generated almost exclusively as rolling friction in the bearings by means of which the float cylinders are fixed to the structure.

As already stated, the structure according to the present invention, as described hitherto, serves as a support for a body of a vessel, in order to form a vessel of an entirely innovative type.

With reference now to FIGS. 5 to 8, purely by way of example a vessel that comprises a structure as described hitherto will now be described.

A vessel 20 according to the present invention comprises propulsion means 21 and 22 for the navigation.

In particular, the propulsion means comprise a first unit 21 of aeronautical type, operating above the surface of the water, for example a turbojet engine or a propeller engine or a turboprop engine.

This choice seems the most appropriate for a vessel of this type, because it makes it possible to have no interaction with the water but only with the air, which offers a much lower resistance and viscosity. Other advantages of this solution are the lightness and the great power that can be installed to the benefit of the speed of the vessel.

Moreover, the propulsion unit will preferably be placed in a central position since a stern position, also considering the weight of the engine, could be dangerous when the bow rises due to waves.

According to the present invention, the vessel 20 comprises first directional means 23 and 24 of an aerodynamic type.

In particular said first directional means comprise one or more vertical rudders 23 and one or more horizontal flaps 24 for steering the vessel.

In addition, one or more aerodynamic appendices, suitable to stabilize the vessel during navigation especially at high speeds, can be provided.

According to the preferred embodiment, the vessel according to the present invention comprises a second engine unit 22 of nautical type, onboard or outboard, advantageously having a stern heel that can be raised with respect to the surface of the water.

Said second engine unit proves particularly useful for a low-speed navigation or to increase the manoeuvrability of the vessel, for example in ports.

In this context, second directional means 25 of a hydrodynamic type are also provided, for example one or more directional fins able to be immersed in the water when navigating at low speed, to be raised with the respect to the surface of the water when navigating at high speed.

Of course, propulsion means including one or more masts and a set of sails can also be provided.

According to the preferred embodiment of the vessel, the support structure is provided with a covering 10, so shaped as to offer a low coefficient of penetration in the air to minimise friction. Moreover, the shapes of the side bulkheads of the cover 10 are such as to convey downwards in any case the flows of air and of water originating from the navigation, again in order to maximise the raising effect due to the lift.

It is obvious that the vessel can have shapes different from those described above, depending on the type of vessel and/or on the particular constructional requirements.

In fact, said structure lends itself to be made in its essential lines both as a small pleasure craft in which speed is favoured and as a large goods and passenger transport unit, whilst maintaining unchanged the easiness of design and construction.

The present invention has been described according to preferred embodiments thereof, presented by way of non-limiting example.

It is to be understood that other embodiments can be envisaged, all to be considered as coming within the scope of protection thereof, as set forth in the appended claims.

The invention claimed is:

1. A floating support structure supporting a hull-less vessel body in a liquid medium, the structure comprising, instead of a hull, a first longitudinal lattice beam element, a second lattice beam element transversally connected to said first beam element, and a multiplicity of substantially cylindrical rotatable floating elements that support said first and second beam elements, each of said floating elements being rotatably mounted on respective supports connected to a respective one of said first and second beam elements so as to be able to rotate freely around its own axis disposed transversally with respect to said first beam element, said floating elements elevating said first and second beam elements and the vessel body above the liquid medium.

2. A floating support structure according to claim 1, wherein each of said first and second beam elements consists of a multiplicity of lattice modules rigidly connected to one another.

3. A floating support structure according to claim 1, wherein said structure is a "T"-shaped one and said first longitudinal beam element has a greater length than said second beam element.

4. A floating support structure according to claim 1, wherein each of said floating elements is mounted on the supports by means of rolling devices with a low coefficient of friction.

5. A floating support structure according to claim 4, wherein said rolling devices with a low coefficient of friction are ball bearings.

6. A floating support structure according to claim 3, wherein said T-shaped structure further comprises a cover.

7. A floating support structure according to claim 1, wherein said second beam element has a substantially triangular shape in section with a tip facing towards the liquid medium.

8. A floating support structure according to claim 1 wherein at least one of said floating elements is mounted on respective supports by means of a corresponding suspension device.

9. A floating support structure able to support a vessel body in a liquid medium, comprising:
    a first longitudinal beam element,
    a second beam element transversally connected to said first beam element, and
    a multiplicity of substantially cylindrical floating elements able to support said structure, each of said floating elements being rotatably mounted on respective supports connected to said structure so as to be able to rotate freely around its own axis disposed transversally with respect to said first beam element,
    wherein at least one of said floating elements has protruding flaps on its surface, disposed so as to facilitate the rolling in the liquid medium.

10. A vessel comprising a vessel body, characterised in that it comprises a floating support structure according to claim 1.

11. A vessel according to claim 10, further comprising propulsion means for the navigation of said vessel.

12. A vessel according to claim 11, wherein said propulsion means comprise a first aeronautical engine, operating above the surface of the liquid medium.

13. A vessel according to claim 12, wherein said first aeronautical engine is one of a turbojet engine, a propeller engine and a turboprop engine.

14. A vessel according to claim 11, further comprising a first aerodynamic control surface.

15. A vessel according to claim 14, wherein said first aerodynamic control surface comprises at least one vertical rudder for steering the vessel.

16. A vessel according to claim 14, wherein said first of aerodynamic control surface comprises at least one horizontal flap for steering the vessel.

17. A vessel according to claim 10, further comprising at least one aerodynamic appendix suitable to stabilize the vessel during navigation.

18. A vessel according to claim 11 wherein said propulsion means comprise a second nautical engine that is onboard or outboard.

19. A vessel comprising a vessel body and a floating support structure,
    the floating support structure being able to support the vessel body in a liquid medium and comprising,
    a first longitudinal beam element,
    a second beam element transversally connected to said first beam element, and
    a multiplicity of substantially cylindrical floating elements able to support said structure, each of said floating elements being rotatably mounted on respective supports connected to said structure so as to be able to rotate freely around its own axis disposed transversally with respect to said first beam element,
    said vessel further comprising propulsion means for navigation of said vessel, wherein said propulsion means comprise a nautical engine that is onboard or outboard, and wherein said nautical engine comprises a stern heel that can be raised with respect to the surface of the liquid medium.

20. A vessel according to claim 11, wherein said propulsion means comprises at least one mast and a set of sails.

21. A vessel according to claim 10, further comprising a second hydrodynamic control surface.

22. A vessel according to claim 21, wherein said second hydrodynamic control surface comprise at least one directional fin able to be immersed in the water.

23. A vessel comprising a vessel body and a floating support structure,
the floating support structure being able to support the vessel body in a liquid medium and comprising,
a first longitudinal beam element,
a second beam element transversally connected to said first beam element, and
a multiplicity of substantially cylindrical floating elements able to support said structure, each of said floating elements being rotatably mounted on respective supports connected to said structure so as to be able to rotate freely around its own axis disposed transversally with respect to said first beam element,
said vessel further comprising a hydrodynamic control surface that includes at least one directional fin able to be immersed in the liquid medium,
wherein said at least one directional fin is adapted to be raised with respect to the surface of the liquid medium.

24. A vessel according to claim 19, wherein said propulsion means further comprises an aeronautical engine, operating above the surface of the liquid medium.

25. A vessel according to claim 24, further comprising an aerodynamic control surface.

26. A vessel according to claim 23, further comprising an aeronautical engine, operating above the surface of the liquid medium.

27. A vessel according to claim 26, further comprising an aerodynamic control surface.

* * * * *